United States Patent [19]

LaMarche

[11] 4,333,552
[45] Jun. 8, 1982

[54] HYDRAULIC PRESSURE RELIEF VALVE

[75] Inventor: Paul E. LaMarche, Utica, Mich.

[73] Assignee: Borg-Warner Corporation, Chicago, Ill.

[21] Appl. No.: 153,130

[22] Filed: May 27, 1980

[51] Int. Cl.³ ............................................. F16D 47/06
[52] U.S. Cl. .................................. 192/3.29; 137/326
[58] Field of Search ...................... 192/3.28, 3.29, 3.3, 192/106.2, 106.1; 137/326

[56] References Cited

U.S. PATENT DOCUMENTS

| | | |
|---|---|---|
| 2,574,573 | 11/1951 | Libby . |
| 2,630,823 | 3/1953 | Mueller et al. ....................... 137/326 |
| 3,734,251 | 5/1973 | Annis et al. ........................... 192/3.3 |
| 3,972,397 | 8/1976 | Cheek ................................... 192/3.3 |
| 3,977,502 | 8/1976 | Chana ................................... 192/3.3 |
| 4,091,899 | 5/1978 | Stevenson . |
| 4,167,993 | 9/1979 | Vukovich et al. ................... 192/3.3 |
| 4,181,203 | 1/1980 | Malloy ................................. 192/3.3 |

FOREIGN PATENT DOCUMENTS 166939  7/1921  United Kingdom .

Primary Examiner—George H. Krizmanich
Attorney, Agent, or Firm—James A. Geppert

[57] ABSTRACT

A pressure relief valve to control the opening of a port between two pressure vessels at a predetermined time to eliminate differential pressure between the vessels. More particularly, the lock-up clutch assembly in a torque converter is actuated due to a pressure differential on the opposite sides of the clutch or piston plate, and the pressure relief valve will open upon deceleration of the vehicle driven by the torque converter to equalize the pressure on the opposite sides of the clutch plate and allow disengagement of the clutch plate from the torque converter housing.

17 Claims, 24 Drawing Figures

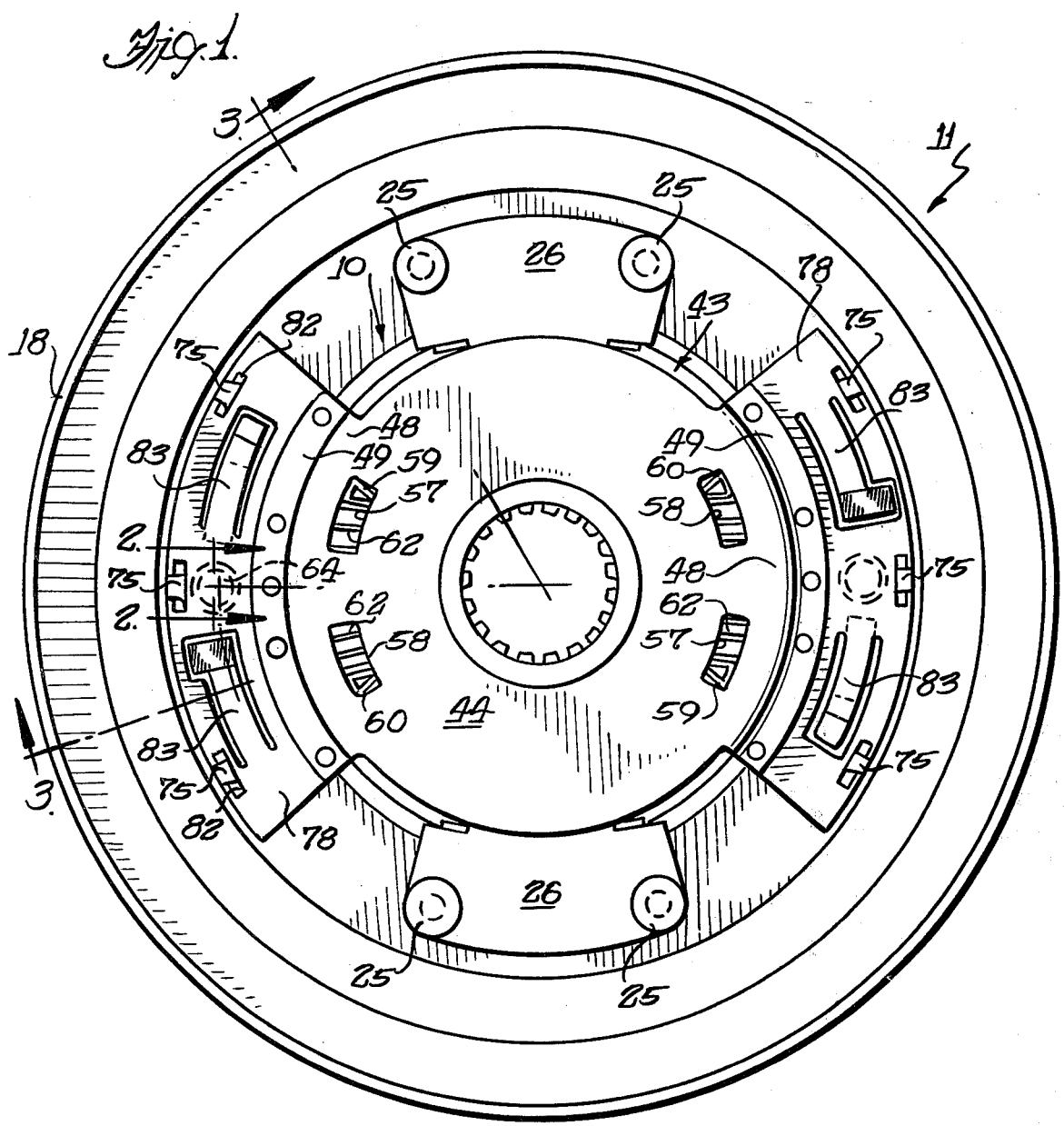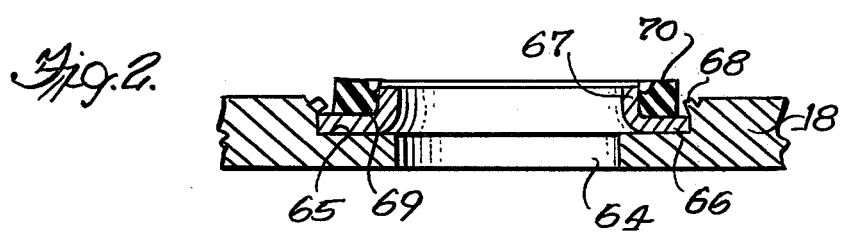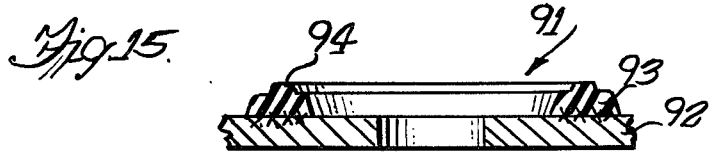

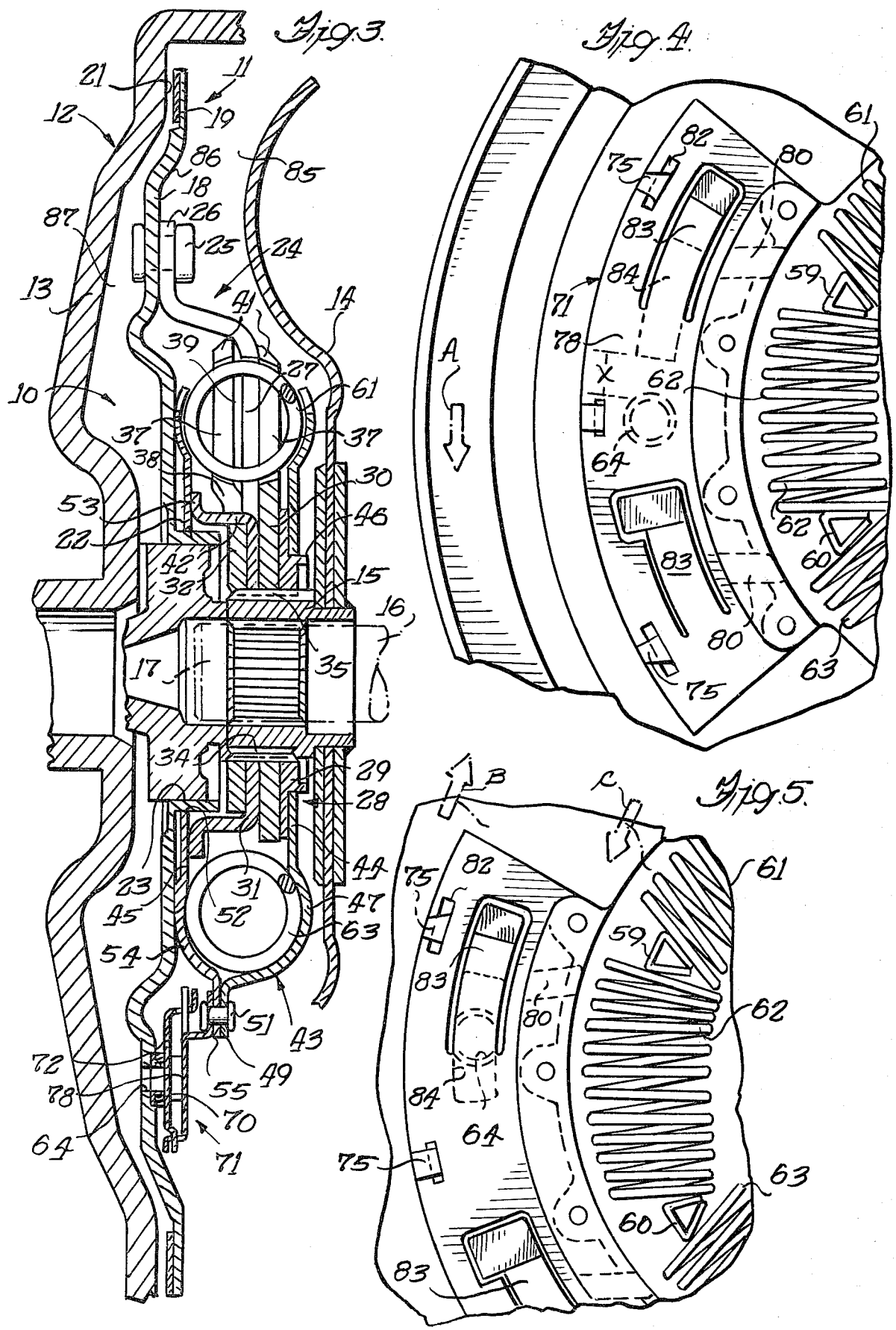

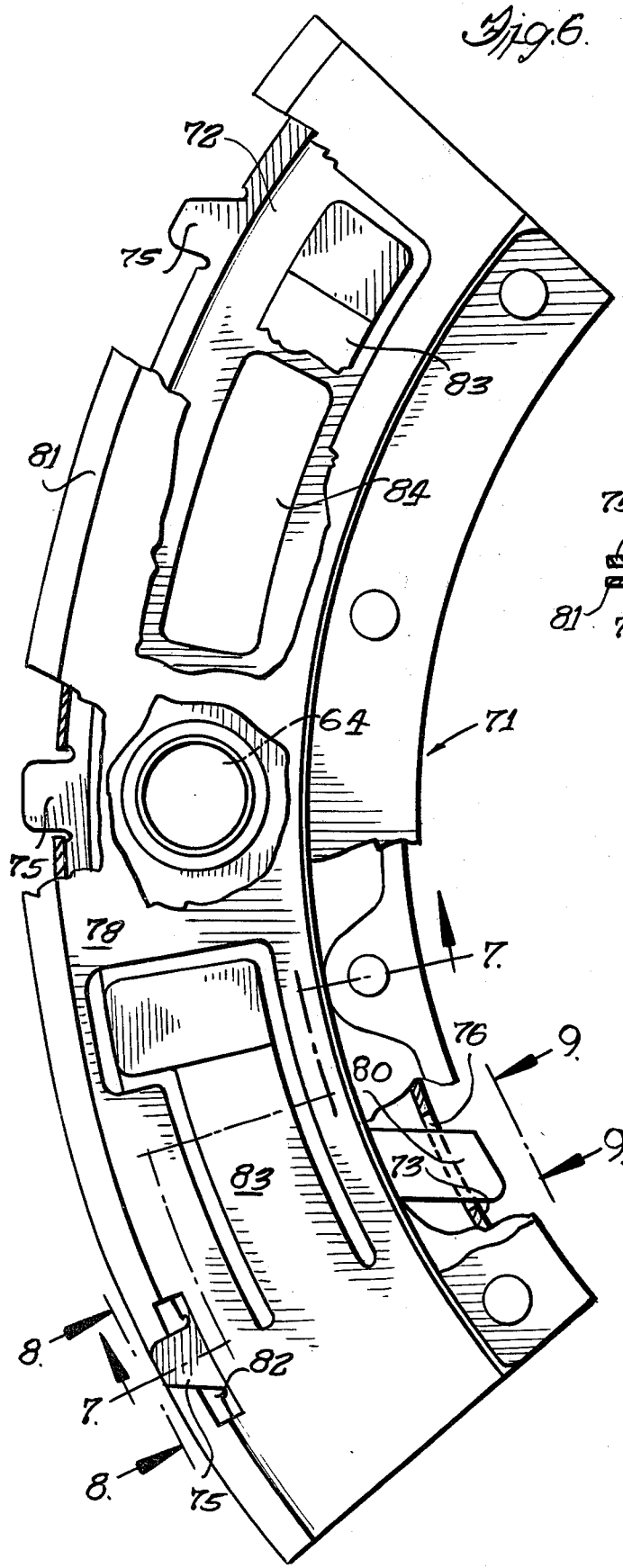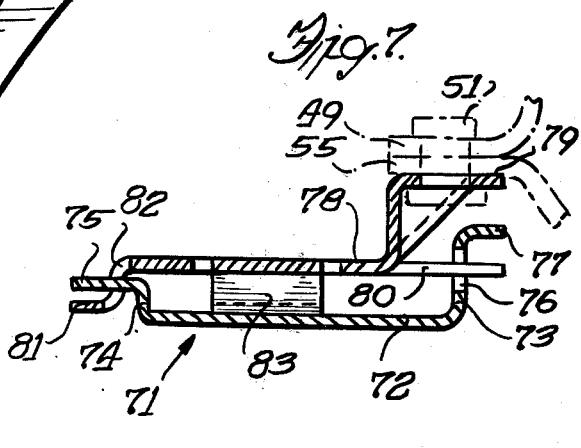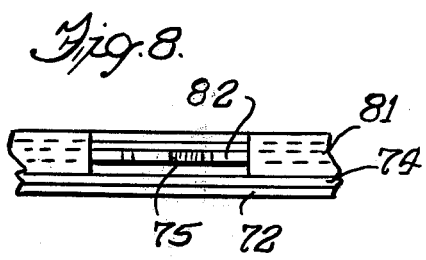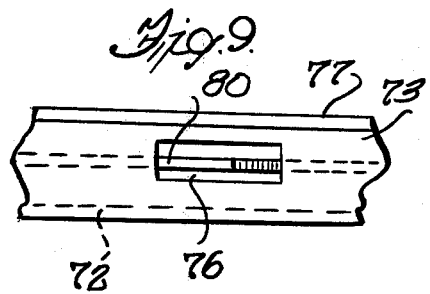

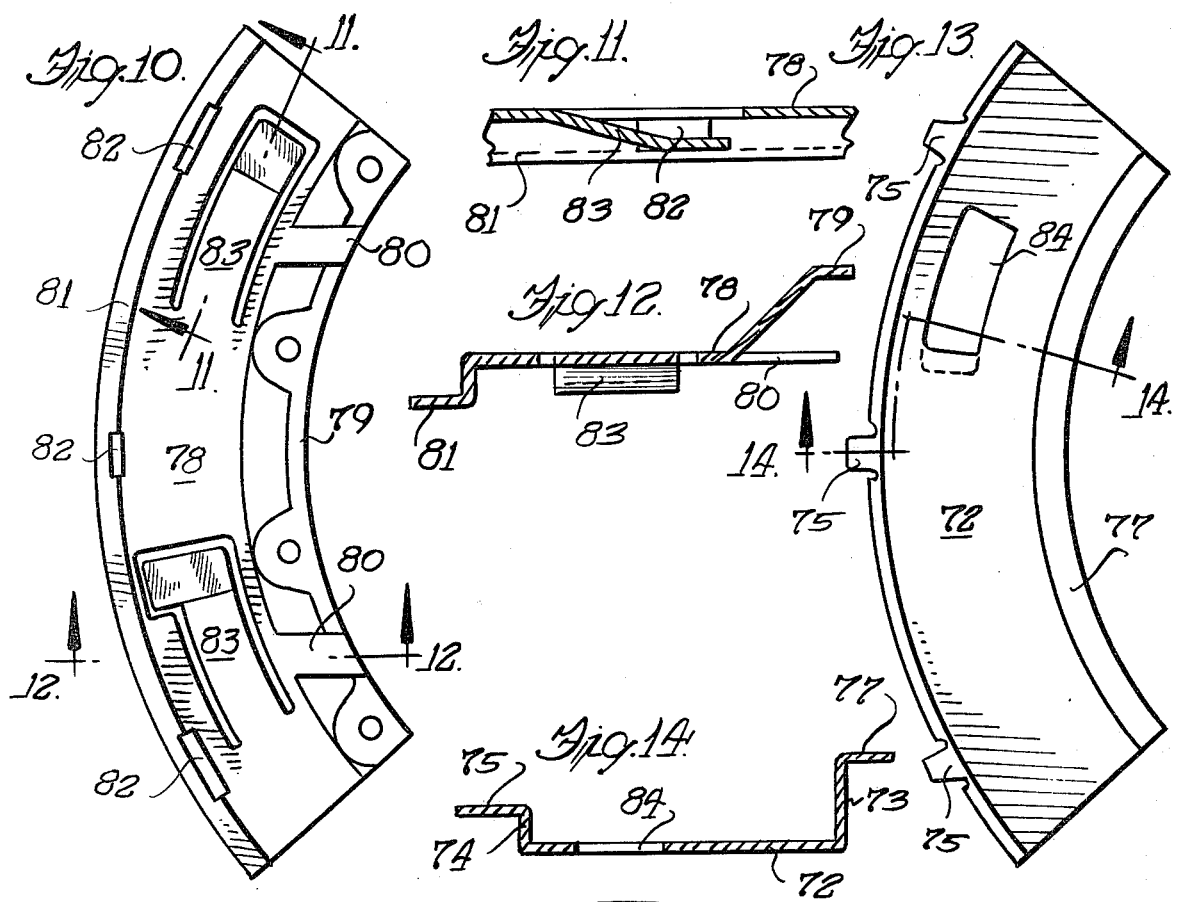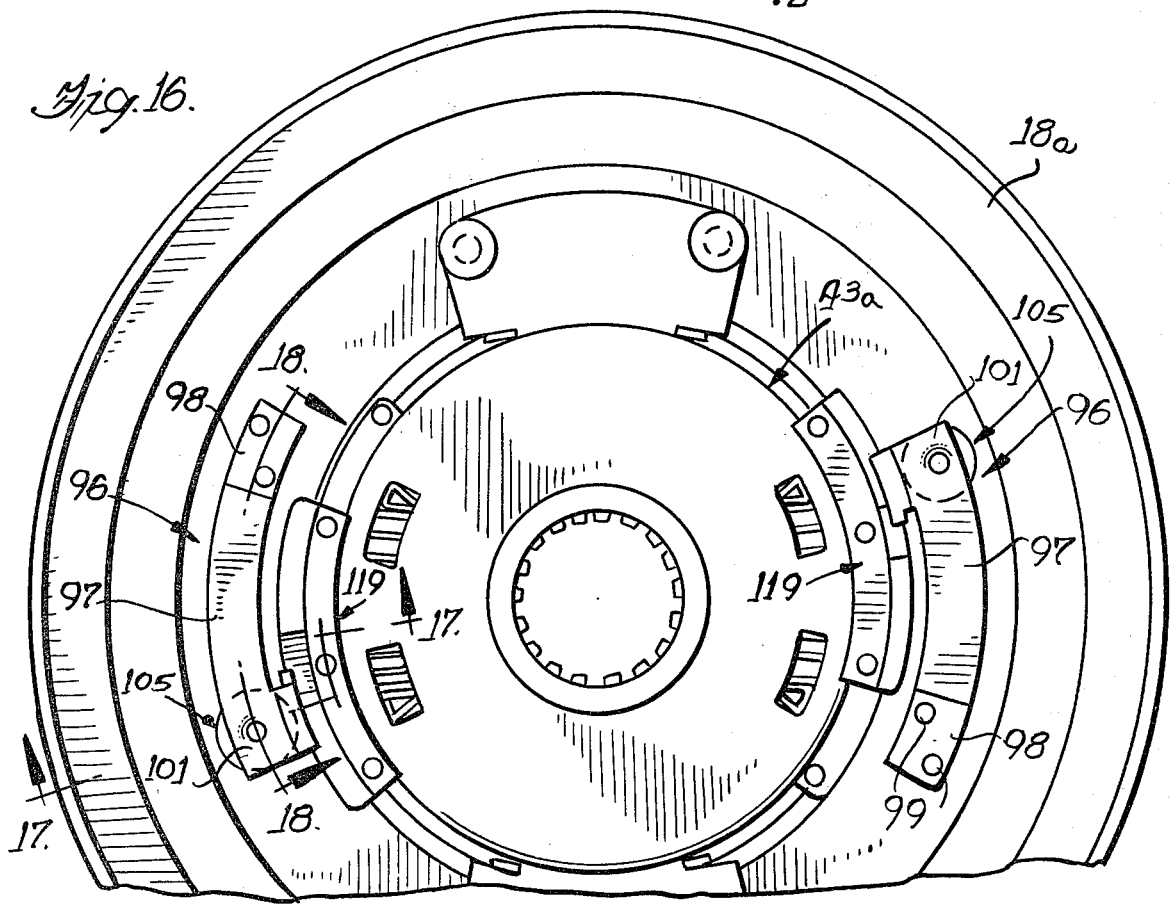

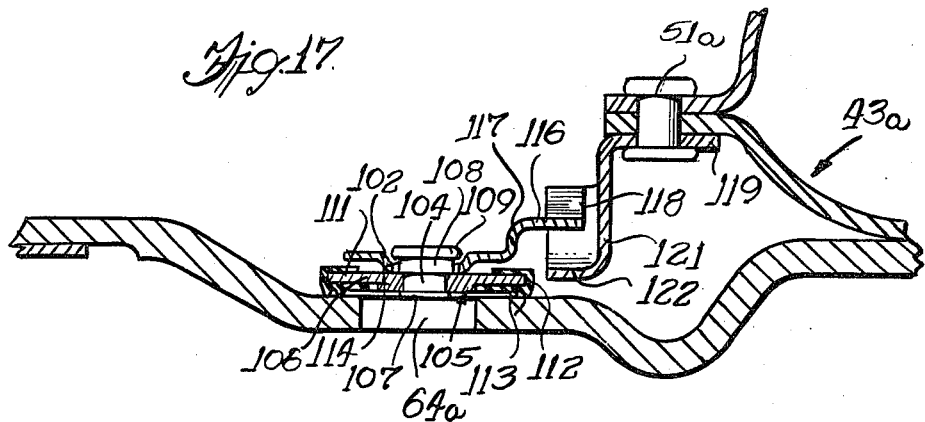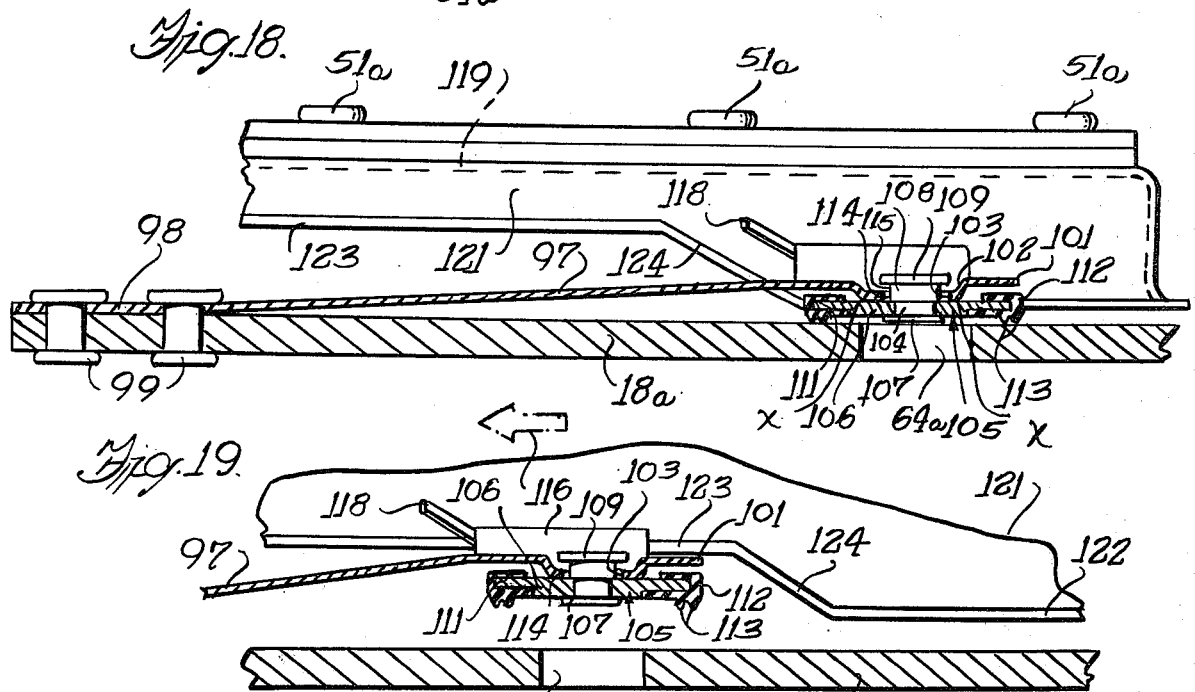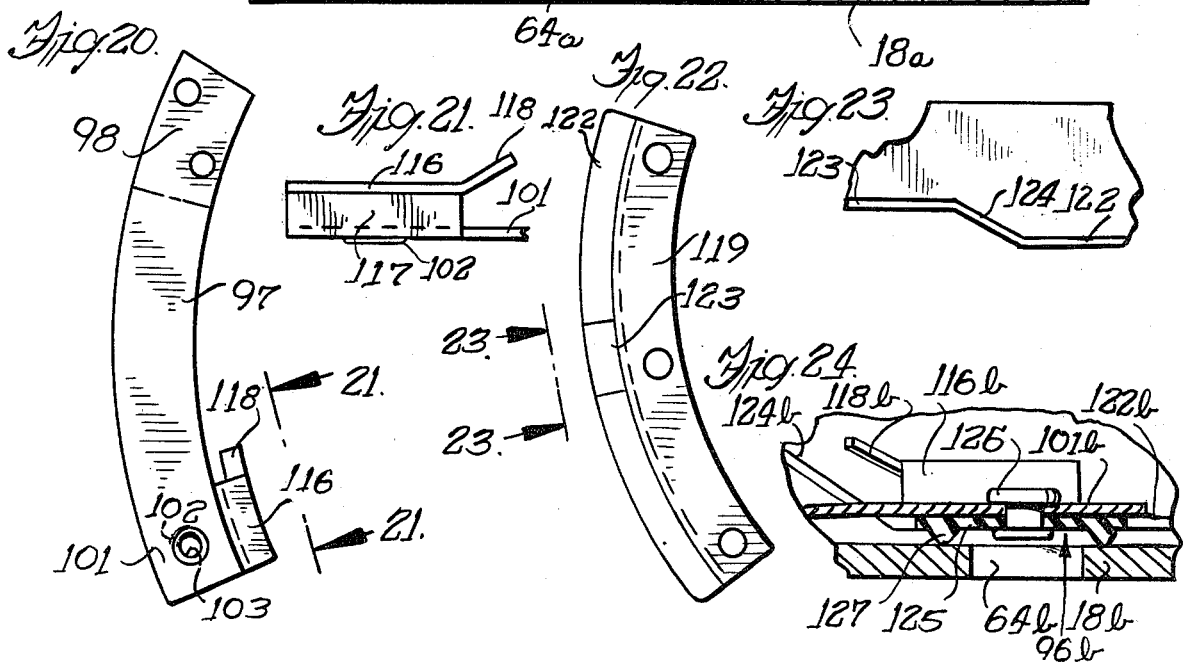

4,333,552

HYDRAULIC PRESSURE RELIEF VALVE

BACKGROUND OF THE INVENTION

The present invention relates to a lock-up clutch utilized in a torque converter to provide a direct drive between the impeller and turbine of the torque converter and improve the fuel efficiency of the transmission. The lock-up clutch assembly includes a piston or clutch plate located in the torque converter between the forward wall of the housing and the turbine. The piston plate is operatively connected to the transmission input shaft through the turbine hub, and a vibration damper may be inserted between the piston plate and the turbine hub to dampen any torsional vibrations occuring from the vehicle engine or other driving means.

The piston plate and associated structure is designed to reciprocate axially relative to the turbine hub and transmission input shaft so that an annular friction facing on the piston plate engages a mating friction surface in the torque converter housing. Actuation of the piston plate is caused by a pressure differential in the chambers formed on the opposite sides of the piston plate due to the pressure increase resulting from operation of the torque converter. To disengage the lock-up clutch, the pressure differential must be equalized or reversed to allow the piston plate to retract, which may be accomplished by providing a source of pressure acting on the opposite side of the pressure plate.

If the vehicle operator lifts his foot from the accelerator, thus decreasing the engine rpms, a quick and positive disengagement of the clutch piston plate is desirable; especially for a vehicle powered by a diesel engine. The use of the pressure source to retract the plate and/or a one-way clutch in the operative connection between the piston plate and turbine hub have not satisfactorily solved the problem of disengagement of the clutch, however, the pressure relief valve of the present invention appears to obviate the problem.

SUMMARY OF THE INVENTION

The present invention comprehends the provision of a hydraulic pressure relief valve utilized for the piston or clutch plate of a lock-up clutch in a torque converter, and more specifically to a lock-up clutch for a torque converter employing a vibration damper assembly such as shown in FIGS. 9 through 11 of copending U.S. patent application Ser. No. 106,593, filed Dec. 26, 1979, now U.S. Pat. No. 4,302,951

The present invention also comprehends the provision of a novel hydraulic pressure relief valve that is operatively connected to and is actuated by the movement of a floating equalizer in the vibration damper assembly to control a port formed in the piston plate of the lock-up clutch. This valve may be of the sliding type and is always in motion. In the neutral and drive modes of the torque converter, the valve retains the port in a closed condition so that a pressure differential may exist on the opposite sides of the piston plate to provide engagement of the clutch at a predetermined condition. However, when the coast mode is employed, the valve slides due to relative movement between the damper and piston plate to open the port in the piston plate and results in a pressure equilibrium on the opposite sides of the piston plate.

The present invention further comprehends the provision of a hydraulic pressure relief valve in a torque converter lock-up clutch wherein the valve is always in motion to provide improved calibration and life of the valve unit and has a positive actuation.

Another object of the present invention comprehends the provision of a positive sealing poppet valve mounted on the piston plate by an elongated leaf spring; the valve body including an annular resilient sealing gasket and an offset camming ear. A camming ramp, adapted to be engaged by the camming ear, is secured to the floating equalizer of the torsional vibration damper for the lock-up clutch. When there is relative movement between the floating equalizer and the piston plate in the coast mode, the camming ramp positively lifts the poppet valve to uncover the opening in the piston plate and equalizes the pressure on the opposite sides of the plate.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of a torsional vibrational damper assembly employing a pair of hydraulic sliding valves for a torque converter lock-up clutch assembly.

FIG. 2 is a cross sectional view taken on line 2—2 of FIG. 1 of a port and valve seat in the piston plate controlled by the sliding valve.

FIG. 3 is a cross sectional view of the vibration damper assembly taken on the irregular line 3—3 of FIG. 1 and showing a hydraulic slide valve and valve seat.

FIG. 4 is an enlarged partial rear elevational view of the hydraulic sliding valve in the damper in closed position.

FIG. 5 is an enlarged partial rear elevational view of the sliding valve and damper assembly similar to FIG. 4 but showing the valve in its open position.

FIG. 6 is an enlarged rear elevational view of the hydraulic sliding valve assembly removed from the damper assembly with portions broken away.

FIG. 7 is a cross sectional view of the pressure relief valve taken on the irregular line 7—7 of FIG. 6.

FIG. 8 is a partial side elevational view taken on the line 8—8 of FIG. 6.

FIG. 9 is a partial side elevational view taken on the line 9—9 of FIG. 6.

FIG. 10 is a top plan view of the spring plate for the valve assembly.

FIG. 11 is a cross sectional view taken on the line 11—11 of FIG. 10.

FIG. 12 is a cross sectional view taken on the line 12—12 of FIG. 10.

FIG. 13 is a top plan view of the valve plate.

FIG. 14 is a cross sectional view taken on the line 14—14 of FIG. 13.

FIG. 15 is a cross sectional view of an alternate form of valve seat.

FIG. 16 is a partial rear elevational view of a torsional vibration damper assembly utilizing the preferred form of hydraulic pressure equalization poppet valve.

FIG. 17 is an enlarged cross sectional view of the pressure relief valve taken on the irregular line 17—17 of FIG. 16.

FIG. 18 is an enlarged cross sectional view of the valve taken on the curved line 18—18 of FIG. 16.

FIG. 19 is a partial cross sectional view similar to FIG. 18, but with the valve shown in open position.

FIG. 20 is a top plan view of the valve spring for the valve assembly of FIG. 16.

FIG. 21 is a partial side elevational view of the valve spring taken on the line 21—21 of FIG. 20.

FIG. 22 is a top plan view of the cam plate for the valve spring.

FIG. 23 is a partial side elevational view of the cam plate taken on the line 23—23 of FIG. 22.

FIG. 24 is a partial enlarged cross sectional view of an alternate form of poppet valve.

DESCRIPTION OF THE PREFERRED EMBODIMENTS

Referring more particularly to the disclosure in the drawings wherein are shown illustrative embodiments of the present invention, FIGS. 1 through 5 disclose a vibration damper assembly 10 adapted for use in a lock-up clutch 11 of a torque converter 12 having a housing 13 driven by a vehicle engine (not shown) and secured to an impeller. A turbine 14 having a hub 15 is driven by the impeller and is located in the housing; the hub being internally splined to receive the splined end 17 of the transmission input shaft 16.

The lock-up clutch includes a piston plate 18 having an annular friction surface 19 adjacent the periphery facing a mating friction surface 21 on the interior surface of housing 13 and an inner annular flange 22 defining a central opening 23. Secured to the piston plate 18 by rivets 25 are a pair of oppositely disposed drive tangs 24, each tang having a base 26 and an offset projection 27 extending inwardly into the damper assembly 10. The damper assembly 10 includes a hub assembly 28 having a barrel plate 29, a rear hub plate 30, a spacer cup 31 and a front hub plate 32; all secured together by rivets and having axially aligned internal splines 34 to receive the external splines 35 formed on the turbine hub 15. Each hub plate has an annular flat body with a pair of oppositely disposed arms 37 extending outwardly from the body; the front hub plate arms being offset at 38 to form a circumferentially extending slot 39 between the axially aligned arms to receive a projection 27 of the drive tangs. Each arm has outwardly diverging edges terminating in circumferentially extending fingers 41, and the arms 37 of the front hub plate 32 extend outwardly through notches formed in the axial wall 42 of the spacer cup 31.

A floating equalizer 43 comprises a pair of plates 44 and 45 forming the spring housing; the rear plate 44 having a central opening journalled on a shoulder 46 formed on the rear surface of the hub barrel plate 29. The plate 44 has a substantially flat central portion with a slightly outwardly and then inwardly curved outer portion 47 terminating is a pair of diametrically opposed curved arms 48 with radial flanges 49 having spaced openings to receive rivets 51 to hold the plates together.

The front plate 45 has a central opening 52 encompassing flange 22, with the substantially flat inner portion of the plate positioned closely adjacent the outer flange 53 of spacer cup 31. The plate terminates in a pair of diametrically opposed rearwardly curved arms 54 with radial flanges 55 having openings receiving the rivets 51 so that the flanges 49 and 55 abut.

Located within the curved arms 48 and 54 are two pairs of elongated openings or windows 57 and 58; each pair of windows being diametrically opposed and positioned within the arc of arms 48 and 54. The windows in the front and rear plates are axially aligned to receive the opposite ends of a spring divider or separator 59 or 60, each separator being in the form of an elongated pin produced by sheet metal bent into a generally triangular shape in cross section. Positioned circumferentially between the hub arms 37 and the separators 59 and 60 are spring sets 61, 62 and 63; the sets being arranged in two groups acting in parallel with the spring sets in each group acting in series.

The piston plate 18 has a pair of diametrically oppositely disposed openings 64,64 therein generally radially aligned with but outside the diameter of the flanges 49,55 of the floating equalizer 43. Each opening is counterbored on the surface facing the damper assembly to provide a shoulder 65 receiving a valve seat therein. Each valve seat includes a metallic cup having a flat body 66 received in the counterbore to abut the shoulder 65 and an inner annular flange 67; the edge of the counterbore being crimped over the cup at 68. Within the cup is an annular resilient seal 69 having a sealing lip or surface 70 extending beyond the edge of the flange 67 to be slidably engaged by an arcuate valve plate 72 forming a pressure relief valve 71; a valve 71 being secured to each of the diametrically opposed pairs of arms 48, 54.

Each valve plate 72 (see FIGS. 7, 13 and 14) has a generally channel shape in cross section with parallel upturned inner and outer walls 73 and 74, respectively; the outer wall 74 terminating in several circumferentially spaced integral tabs 75 thereon, and the inner wall 73 having several circumferentially spaced openings or slots 76 therein and terminating in an inwardly extending flange 77. The valve plate 72 is operatively connected to the floating equalizer 43 through a generally flat spring plate 78 (FIGS. 7 and 10-12) having an upwardly and then inwardly extending flange 79 secured to the equalizer through the rivets 51. The spring plate has several tabs 80 in the same plane as the plate and corresponding in number to and extending into the slots 76 of the valve plate, while an opposite downwardly and then outwardly extending flange 81 includes several openings 82 corresponding in number to and receiving the tabs 75 on the valve plate.

Stamped out of the spring plate 78 are a pair of elongated spring arms 83,83 which are bent downwardly to engage and resiliently bias the valve plate 72 against the resilient annular gasket or seal 69. The arrangement of the tabs 75 and 80 and openings 76 and 82 of the valve plate 72 and spring plate 78, respectively, allows the valve plate to move relative to the spring plate to adjust for any unevenness of the valve seat and the piston plate 18 to preserve a leakproof valve seal. The valve plate includes an elongated opening 84 therein which, as shown in FIGS. 13 and 14, is offset from the opening 64 in the piston plate by a distance "X" when the torque converter is in the neutral and drive modes, but overlaps the opening 64 in the coast mode.

Considering the operation of this device, when the transmission is in neutral or when the torque converter is initially in the drive mode, the piston plate 18 is in its retracted position. As the torque converter begins to increase the speed of the turbine, the fluid pressure in the torque converter increases, with the increasing pressure in chamber 85 acting on the rear surface 86 of the piston plate 18 to urge it towards the housing 13. As the speed of the turbine approaches that of the impeller, the fluid pressure increases and acts on the piston plate until it engages the friction surface 21 on the housing 13 to lock the impeller and turbine together to provide a direct drive from the engine to the transmission. When lock-up occurs, then torque is applied to the piston plate 18 in the direction of the arrow A.

Rotation of the piston plate 18 rotates the drive tangs 24,24 which engage the spring sets 61,61 to compress these springs against the separators 59,59; the separators moving in windows 57,57 to compress the spring sets 62,62 against the separators 60,60 in windows 58,58. Compression of these springs urge the separators to the ends of the windows so that the equalizer 43 is also rotated in the direction of arrow A to compress spring sets 63,63 which act on hub arms 37,37 to rotate the hub assembly 28 and the input shaft 16. Rotation of the floating equalizer 43 will act to rotate the spring plate 78 and valve plate 72 to retain the offsets between the piston plate openings 64,64 and the valve plate openings 84,84; the valve plate 72 sliding on the resilient seal 69.

When the vehicle operator removes his foot from the accelerator pedal to decrease the speed of rotation of the housing 13 and impeller, the pressure in the chamber 85 is greater than the pressure in chamber 87 to prevent retraction of the piston plate 18 to unlock the clutch. The torque converter and transmission are in a coast mode and the vehicle acts to drive the motor, causing the piston plate to move in the direction of arrow B relative to the hub and floating equalizer (arrow C) resulting in relative sliding movement between the valve plate 72 and the piston plate 18 so that the opening 84 in the valve plate 72 begins to coincide with the opening 64 in the piston plate 18 to equalize the pressure differential between the chambers 85 and 87, and the piston plate can then be retracted to unlock the clutch. The piston plate will remain disengaged until fluid pressure again increases in chamber 85 upon acceleration of the torque converter.

FIG. 15 discloses an alternate embodiment of valve seat 91 having a metallic body 92 and a resilient annular seal member 93 bonded thereto and having a raised annular bead or lip 94. This valve seat coacts with the sliding valve plate 72 in the same manner as previously described.

FIGS. 16 through 23 disclose the preferred embodiment of a pressure relief poppet valve 96 wherein like parts of the lock-up clutch assembly have the same reference numerals with the addition of a script a. The piston plate 18a again has a pair of oppositely disposed openings 64a; however, the openings are not equipped with resilient valve seats, such as shown in FIGS. 2 and 15. Instead, an arcuate elongated flat valve spring 97 (FIGS. 20 and 21) is positioned on the piston plate 18a and secured thereto at one end 98 by rivets 99 with the opposite end 101 of the spring arm having a depressed portion 102 with a central opening 103 receiving a rivet 104 for the valve member 105.

The valve member 105 includes a flat disc 106 having a central opening receiving the rivet 104 which is headed at 107 to secure the disc against the shoulder formed by an enlarged or swelled shank portion 108 having an enlarged head 109. The disc has a reduced thickness periphery 111 which is embedded in an annular resilient sealing member 112 provided with one or more annular ribs or beads 113 adapted to engage the surface of the piston plate 18a. The diameter of the shank portion 108 is less than the diameter of the opening 103 to provide an annular space 114 therebetween and the head 109 is spaced from the disc 106 a distance greater than the thickness of the spring 97 to provide a space 115 between the head 105 and depressed portion 102 when the valve member 105 engages the piston plate. The spaces 114 and 115 allow the valve member to effectively float and pivot at point X (see FIG. 18) to seal on non-parallel surfaces.

Also formed on the spring end 101 is a cam arm 116 upwardly offset from the spring by connecting portion 117 with a trailing upwardly angled end 118. Secured to the floating equalizer 43a by the rivets 51a is an arcuate cam plate 119 (FIGS. 22 and 23). The cam plate has a depending wall 121 terminating in an outwardly extending camming flange 122 having a central raised portion 123 with inclined ramps 124,124 joining the raised portion with the remainder of the flange 122.

FIGS. 17 and 18 disclose the valve member 105 in its normal position with the annular bead 113 engaging the surface of the piston plate 18a around the opening 64a. The operation of the vibration damper is substantially the same as for the structure of FIGS. 1 through 5 except that the cam plate moves with the equalizer 43a while the valve spring 97 and resilient valve move with the piston plate while the torque converter and lock-up clutch are in the drive mode. Actually, the inclined ramp 124 on the cam flange 122 moves away from the cam arm 105 of the valve spring.

However, when the vehicle operator removes his foot from the accelerator, the input shaft causes rotation of the equalizer 43a relative to the piston plate 18a, so that the cam plate 119 moves relative to the valve spring 97 causing the cam arm 116 to ride up the ramp 124 to the central raised portion 123. This camming of the valve spring lifts the valve member 105 and spring arm from the closed position of FIG. 18 to the open position of FIG. 19 to equalize the pressure on both sides of the piston plate 18a and allow the clutch to unlock, until acceleration of the torque converter again results in a locked-up direct drive between the impeller and turbine.

FIG. 24 discloses an alternate version of the poppet valve 96b wherein a resilient valve member 125 is rigidly secured to the spring end 101b by a rivet 126. This valve member has one or more annular depending ribs or beads 127 that sealingly engage the surface of the piston plate 18b to close the opening 64b. The spring end 101b again has a cam arm 116b with a trailing end 118b; the cam arm riding on a camming flange 122b secured to the floating equalizer. This poppet valve is operated in the same manner as the valve member 105 except for the pivotal mounting on the spring.

I claim:

1. In a lock-up clutch assembly for a torque converter having a vibration damper therein, the assembly including a piston plate adapted to engage the housing of the torque converter, a hub assembly operatively connected to the hub of the torque converter turbine and having a pair of oppositely disposed radially extending hub arms, a floating equalizer journalled on said hub assembly and having spring separators mounted therein, a plurality of compression springs positioned between said spring separators and hub arms, and drive means secured to said piston plate and extending into the path of said compression springs, the improvement comprising pressure relief valve to equalize the pressure on the opposite sides of the piston plate, said piston plate having at least one opening therein, a resilient sealing member encompassing said opening, and said relief valve including a sliding valve plate having an opening therein offset from said piston plate opening in the neutral and drive modes of the torque converter, and a spring plate having an upwardly offset mounting portion secured to said floating equalizer and operatively connected to said valve plate, and a pair of downwardly biased spring arms integral with said spring plate engaging and biasing said valve plate against said resilient sealing member, wherein actuation of the valve occurs to uncover said piston plate opening due to movement of said floating equalizer relative to said piston plate upon deceleration of the torque converter in the coast mode.

2. A pressure relief valve as set forth in claim 1, in which said valve plate has a channel shape in cross section with an outer wall terminating in spaced locating tabs and an inner wall having spaced slots formed therein, said valve plate opening being positioned toward one end thereof.

3. A pressure relief valve as set forth in claim 2, in which said spring plate has a plurality of integral inner tabs projecting into the slots in said valve plate and a downwardly extending outer flange having a plurality of slots receiving the tabs on said valve plate.

4. In a lock-up clutch assembly for a torque converter having a vibration damper therein, the assembly including a piston plate adapted to engage the housing of the torque converter, a hub assembly operatively connected to the hub of the torque converter turbine and having a pair of oppositely disposed radially extending hub arms, a floating equalizer journalled on said hub assembly and having spring separators mounted therein, a plurality of compression springs positioned between said spring separators and hub arms, and drive means secured to said piston plate and extending into the path of said compression springs, the improvement comprising a pressure relief valve to equalize the pressure on the opposite sides of the piston plate, said piston plate having at least one opening therein, a resilient sealing member encompassing said opening, and said relief valve including a sliding valve plate having an opening positioned toward one end thereof, and a spring plate having an upwardly offset mounting portion secured to said floating equalizer, said valve plate having a channel shape in cross section with an outer wall terminating in spaced locating tabs and an inner wall having spaced slots formed therein, said spring plate having a plurality of integral inner tabs projecting into the slots in said valve plate and a downwardly extending outer flange having a plurality of slots receiving the tabs on said valve plate, said inner spring plate tabs being located in the same plane as the spring plate, and a pair of downwardly biased spring arms integral with said spring plate engaging and biasing said valve plate against said resilient sealing member, said valve plate opening being offset from said piston plate opening in the neutral and drive modes of the torque converter and at least partially overlaps said piston plate opening in the coast mode, wherein actuation of the valve to uncover said piston plate opening occurs due to movement of said floating equalizer relative to said piston plate upon deceleration of the torque converter.

5. A pressure relief valve as set forth in claim 4, in which said tab and slot connections between the valve plate and spring plate provide ease of adjustment of the valve plate, and said spring arms constantly urge the valve plate into sealing engagement with said resilient sealing member in the piston plate.

6. In a lock-up clutch assembly for a torque converter having a vibration damper therein, the assembly including a piston plate adapted to engage the housing of the torque converter, a hub assembly operatively connected to the hub of the torque converter turbine and having a pair of oppositely disposed radially extending hub arms, a floating equalizer journalled on said hub assembly and having spring separators mounted therein, a plurality of compression springs positioned between said spring separators and hub arms, and drive means secured to said piston plate and extending into the path of said compression springs, the improvement comprising a pressure relief valve to equalize the pressure on the opposite sides of the piston plate, said piston plate having at least one opening therein, said relief valve including a movable valve member having an elongated spring arm with one end secured to said piston plate and resilient valve means mounted at the opposite end of the spring arm to cover the piston plate opening, and camming means operatively connected to said floating equalizer and cooperating with said spring arm to uncover the piston plate opening when the torque converter is in the coast mode, wherein actuation of the valve occurs due to movement of said floating equalizer relative to said piston plate upon deceleration of the torque converter.

7. A pressure relief valve as set forth in claim 6, in which said valve means comprises a resilient member secured to said spring arm and having at least one annular raised bead encompassing said piston plate opening.

8. A pressure relief valve as set forth in claim 6, in which said camming means comprises a cam plate having an upwardly offset mounting flange secured to said floating equalizer and a camming flange having a central raised portion joined to the remainder of the flange by inclined ramps.

9. A pressure relief valve as set forth in claim 8, in which the end of the spring arm carrying the resilient valve member has a laterally extending cam arm engaging said camming flange.

10. A pressure relief valve as set forth in claim 9, in which said lateral cam arm is upwardly offset from said spring arm and has an upwardly inclined guide arm.

11. A pressure relief valve as set forth in claim 10, in which deceleration of the torque converter causes the floating equalizer to move relative to the piston plate, resulting in movement of the cam plate relative to the spring arm to cam the spring arm and lift the resilient valve member away from the piston plate opening to equalize the pressure on the opposite sides of the plate.

12. A pressure relief valve as set forth in claim 6, in which said valve means is loosely mounted on the end of the spring arm so as to pivot relative to the spring arm to compensate for uneven surfaces contacted by the valve means.

13. A pressure relief valve as set forth in claim 12, in which said valve means comprises a disc having at least a portion of disc surface covered with a resilient sealing material.

14. A pressure relief valve as set forth in claim 13, including a rivet secured to and extending through said disc and through said spring arm to be loosely mounted therein.

15. A pressure relief valve as set forth in claim 14, in which said spring arm has a depressed portion with an opening therein adjacent the free end of said spring arm, and said rivet has an enlarged shank portion loosely received in the opening and defining a shoulder against which the valve disc is secured.

16. A pressure relief valve as set forth in claim 15, in which said enlarged rivet shank portion is headed with the head spaced from the spring arm to allow for pivotal motion of the valve disc.

17. A pressure relief valve as set forth in claim 14, including at least one annular sealing bead depending from the valve disc to engage said piston plate and surrounding the opening therein.

* * * * *

UNITED STATES PATENT AND TRADEMARK OFFICE
CERTIFICATE OF CORRECTION

PATENT NO. : 4,333,552
DATED : June 8, 1982
INVENTOR(S) : PAUL EMILE LAMARCHE

It is certified that error appears in the above—identified patent and that said Letters Patent is hereby corrected as shown below:

Column 6, line 63, before "pressure relief valve" insert -- a --.

Signed and Sealed this

Seventeenth Day of August 1982

[SEAL]

Attest:

GERALD J. MOSSINGHOFF

Attesting Officer    Commissioner of Patents and Trademarks